(12) United States Patent
Mu et al.

(10) Patent No.: US 10,870,380 B2
(45) Date of Patent: Dec. 22, 2020

(54) INTEGRAL SINGLE-FRAME TWO-WAY HEADREST WITH U-SHAPED SINGLE ROD

(71) Applicant: Ningbo Jifeng Auto Parts Co., Ltd., Zhejiang (CN)

(72) Inventors: Pu Wei Mu, Zhejiang (CN); Li Ying Cheng, Zhejiang (CN)

(73) Assignee: Ningbo Jifeng Auto Parts Co., Ltd., Zhejiang (CN)

( * ) Notice: Subject to any disclaimer, the term of this patent is extended or adjusted under 35 U.S.C. 154(b) by 97 days.

(21) Appl. No.: 16/170,054

(22) Filed: Oct. 25, 2018

(65) Prior Publication Data

US 2019/0061583 A1 Feb. 28, 2019

Related U.S. Application Data

(63) Continuation of application No. PCT/CN2017/100341, filed on Sep. 4, 2017.

(30) Foreign Application Priority Data

Jun. 21, 2017 (CN) .......................... 2017 1 0473997

(51) Int. Cl.
*B60N 2/815* (2018.01)
*B60N 2/897* (2018.01)
(Continued)

(52) U.S. Cl.
CPC ............. *B60N 2/815* (2018.02); *B60N 2/818* (2018.02); *B60N 2/897* (2018.02); *B60N 2002/899* (2018.02)

(58) Field of Classification Search
None
See application file for complete search history.

(56) References Cited

U.S. PATENT DOCUMENTS

| 4,568,123 A * | 2/1986 | Yasui | ..................... | B60N 2/824 |
| | | | | 297/410 |
| 4,606,578 A * | 8/1986 | Yasui | ..................... | B60N 2/838 |
| | | | | 297/408 |

(Continued)

FOREIGN PATENT DOCUMENTS

| CN | 103538509 | 1/2014 |
| CN | 203727214 | 7/2014 |

(Continued)

*Primary Examiner* — David R Dunn
*Assistant Examiner* — Christopher E Veraa
(74) *Attorney, Agent, or Firm* — JCIPRNET

(57) ABSTRACT

Provided is an integral single-frame two-way headrest with a U-shaped single rod, comprising a U-shaped rod, an integral frame and a cover, the integral frame being externally covered with the cove, and the integral frame is hollow inside. An opening is arranged at a lower end of the integral frame, and an upper portion of the U-shaped rod is inserted into the inner frame from the opening, a plurality of positioning grooves is arranged on the right side of two downwardly extending ends of the U-shaped rod. A rod guide sleeve sleeved on both ends of the U-shaped rod is mounted at both ends of the opening, and the outer side of the integral frame is mounted with an unlocking steel wire corresponding to the positioning groove at both ends of the U-shaped rod, an unlocking lever connected with the unlocking steel wire and laterally movable is mounted in a hollow portion of the integral frame. The present invention has the characteristics of simple structure, convenient assembly and greatly reduced production cost.

7 Claims, 12 Drawing Sheets

(51) Int. Cl.
*B60N 2/818* (2018.01)
*B60N 2/80* (2018.01)

(56) References Cited

U.S. PATENT DOCUMENTS

| | | | | |
|---|---|---|---|---|
| 6,068,337 | A * | 5/2000 | De Filippo | B60N 2/815 297/391 |
| 2005/0088027 | A1* | 4/2005 | Yetukuri | B60N 2/85 297/408 |
| 2005/0280305 | A1* | 12/2005 | Gurtatowski | B60N 2/818 297/410 |
| 2012/0080924 | A1* | 4/2012 | Steinmetz | B60N 2/818 297/391 |
| 2012/0080925 | A1* | 4/2012 | Steinmetz | B60N 2/815 297/391 |
| 2013/0069412 | A1* | 3/2013 | Tscherbner | A47C 7/38 297/391 |
| 2013/0207437 | A1* | 8/2013 | Gottwald | B60N 2/815 297/391 |
| 2017/0334327 | A1* | 11/2017 | Diefenthaler | B60N 2/812 |
| 2017/0349071 | A1* | 12/2017 | Muller | B60N 2/815 |

FOREIGN PATENT DOCUMENTS

| | | |
|---|---|---|
| CN | 104002714 | 8/2014 |
| CN | 104942577 | 9/2015 |
| CN | 204978321 | 1/2016 |
| CN | 205970958 | 2/2017 |
| DE | 202007007111 | 9/2007 |

\* cited by examiner

INTEGRAL SINGLE-FRAME TWO-WAY HEADREST WITH U-SHAPED SINGLE ROD

CROSS-REFERENCE TO RELATED APPLICATION

This application is a continuation of international PCT application serial no. PCT/CN2017/100341, filed on Sep. 4, 2017, which claims the priority benefit of China application no. 201710473997.6, filed on Jun. 21, 2017. The entirety of each of the above-mentioned patent applications is hereby incorporated by reference herein and made a part of this specification.

BACKGROUND

Technical Field

The present invention relates to the technical field of automobile headrests, in particular to an integral single-frame two-way headrest with a U-shaped single rod.

Description of Related Art

A conventional simple type of a two-way headrest is usually assembled in two structures. One structure uses a combined headrest frame and a U-shaped single rod. When installing, the U-shaped single rod is first installed in a splicing piece of the headrest frame, and then the entire product is assembled. As disclosed in Patent Publication No. CN201510282566, the assembling method is mainly used to produce a headrest with this structure. This kind of production reduces the strength of the headrest frame itself and also make it difficult to assemble the headrest, which increases labor costs. The second structure is mentioned in Patent Publication No. CN201310451754. The structure uses two separate rods. When installing, the two separate rods are first installed in the headrest frame, and then the two rods are connected by welding to finish the assembly process. Such method greatly affects the strength of the headrest and is inconvenient for the workers to performing assembling. In order to solve the defects of the above two kinds of two-way headrests while improving the production efficiency of the headrest and reducing the cost of the headrest, it is very necessary to design a new two-way headrest.

SUMMARY

The technical problem to be solved by the present invention is to provide an integral single-frame two-way headrest with a U-shaped single rod. By designing an integral headrest frame with a hollow lower portion and a central portion and a U-shaped single rod, the assembly of the two-way headrest is facilitated, the strength of the headrest is increased, the cost of the headrest is reduced, and the labor cost in the production process is reduced.

The technical solution used by the present invention to solve the technical problem thereof is to provide an integral single-frame two-way headrest with a U-shaped single rod, comprising a U-shaped rod, an integral frame and a cover, the integral frame being externally covered with the cover, the integral frame is hollow inside, an opening is arranged at a lower end of the integral frame, and an upper portion of the U-shaped rod is inserted into the inner frame from the opening, a plurality of positioning grooves is arranged on the right side of two downwardly extending ends of the U-shaped rod, a rod guide sleeve sleeved on both ends of the U-shaped rod is mounted at both ends of the opening, and the outer side of the integral frame is mounted with an unlocking steel wire corresponding to the positioning groove at both ends of the U-shaped rod, an unlocking lever connected with the unlocking steel wire and laterally movable is mounted in a hollow portion of the integral frame.

A rod limit bracket is arranged above the rod guide sleeve, the rod limit bracket is fastened in the integral frame, and a connecting hole matching with the U-shaped rod is arranged in the middle portion thereof, a positioning extension is disposed on a side of the rod limit bracket near the middle of the integral frame, a positioning post is vertically disposed on the positioning extension, and the positioning post is pressed against the middle of the U-shaped rod when the U-shaped rod is moved downward.

A deformable inner wall is arranged at a lower portion of the rear side wall of the connecting hole, a leakage groove is disposed inside the deformable inner wall, and the deformable inner wall is provided with mounting grooves at both ends thereof, and a metal elastic sheet that passes through the leakage groove is installed between two mounting grooves.

A lower outer ring of the rod guide sleeve is provided with a fastening protrusion that matches with both sides of the opening of the integral frame, a positioning through hole is arranged in a middle portion of the rod guide sleeve, an arc-shaped groove is formed under an inner wall of the rear side of the positioning through hole, and the metal elastic sheet is mounted in the arc-shaped groove, a front portion of the rod guide sleeve is provided with a protective extension extending upwardly and covering the mounting position of the unlocking steel wire, and an inner groove matching with the unlocking steel wire is provided on a rear side of the protective extension.

A central portion of the hollow portion of the integral frame is arranged with a protruding positioning plate at a lower end near the upper side of the unlocking lever, a spring mounting portion is disposed on the upper side of the unlocking lever at a position on the left side of the protruding positioning plate, and a positioning protrusion is disposed at a position on the upper side of the unlocking lever at the right side of the protruding positioning plate, a lower portion of the left side of the protruding positioning plate is arranged with a protruding column, and a return spring is installed between the protruding column and the spring mounting portion.

The positioning protrusion is higher than the lower end of the protruding positioning plate, and a side of the positioning protrusion near the protruding positioning plate has a vertical wall structure.

Unlocking grooves corresponding to each of two unlocking steel wires respectively are arranged on a lower side of the unlocking lever.

A button seat is mounted on a lower left side of the integral frame at a position near the left end of the unlocking lever, and an unlocking button abutting against the left end of the unlocking lever is mounted in the button seat.

The left end of the unlocking lever is bent downward to form a contact end.

A steel wire fixing protrusion is disposed at a position of the front side of the integral frame where the unlocking steel wire is mounted, and the steel wire fixing protrusion has a semicircular convex structure, the right side of the steel wire fixing protrusion extends upward to form a steel wire positioning extension matching with the vertical portion of the unlocking steel wire, a steel wire positioning groove is disposed at an upper end of the steel wire positioning extension, a lower end of the unlocking steel wire is wound around the outer ring of the steel wire fixing protrusion, and an upper end of the unlocking steel wire is engaged with the steel wire positioning groove.

Technical Effects:

The present invention relates to an integral single-frame two-way headrest using a U-shaped single rod, which has a compact structure and has the following advantages: (1) by using a U-shaped rod as a headrest rod, the strength of the headrest rod is improved to avoid deformation when the headrest rod is used; (2) meanwhile, an integrally formed plastic part is designed as the integral frame which eliminates the technical bias that the conventional U-shaped rod must use a split type frame, greatly improving the strength of the headrest and reducing the material consumption and the cost; (3) while designing the integral frame, the structure of the rod guide sleeve and the rod limit bracket is improved, so that it can be first installed on the U-shaped rod, and the U-shaped rods are inserted into the lower portion of the integral frame and are buckled and positioned with the frame, which greatly facilitates the assembly of the headrest and improves the production efficiency of the product; (4) by arranging the steel wire fixing protrusion on the integral frame, which is convenient for the unlock of the steel wire and prevents the unlocking steel wire from being deformed during work.

Reference signs: 1, cover; 2, U-shaped rod; 3, integral frame; 4, opening; 5, button seat; 6, unlocking button; 7, rod guide sleeve; 8, rod limit bracket; 9, unlocking lever; 10, return spring; 11, contact end; 12, spring mounting portion; 13, unlocking groove; 14, steel wire fixing protrusion; 15, steel wire positioning groove; 16, unlocking steel wire; 17, positioning groove; 18, positioning extension; 19, positioning post; 20, arc-shaped positioning groove; 21, connecting hole; 22, deformable inner wall; 23, mounting groove; 24, metal elastic sheet; 25, protective extension; 26, inner groove; 27, arc-shaped groove; 28, positioning through hole; 29, protruding positioning plate; 30, protruding column; 31, positioning protrusion.

DESCRIPTION OF THE EMBODIMENTS

The present invention is further described below in combination with specific examples. It should be understood that these examples are only for illustrating the present invention and are not intended to limit the scope of the present invention. In addition, it should be understood that after reading the teachings of the present invention, those skilled in the art can make various changes or modifications to the present invention, and these equivalent forms also fall within the scope defined by the appended claims of the present application.

Figure 1:
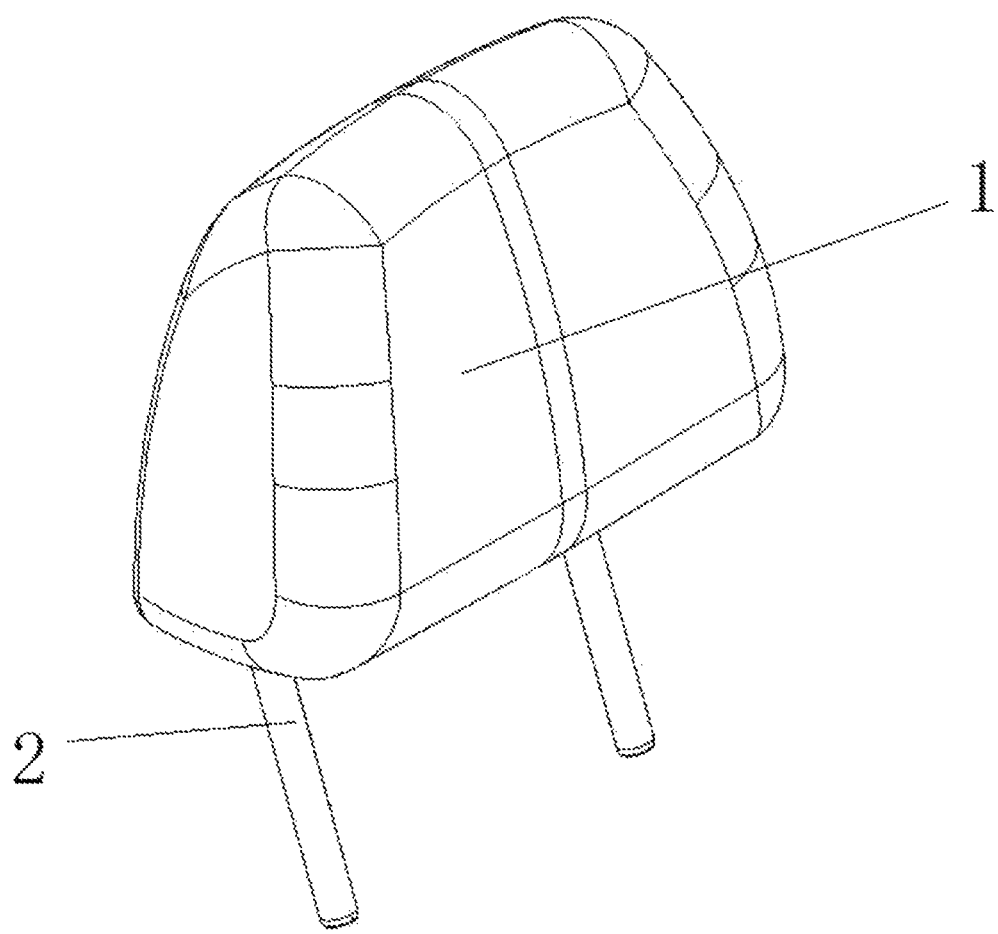
FIG. 1 is a structural view of the present invention.
Figure 2:
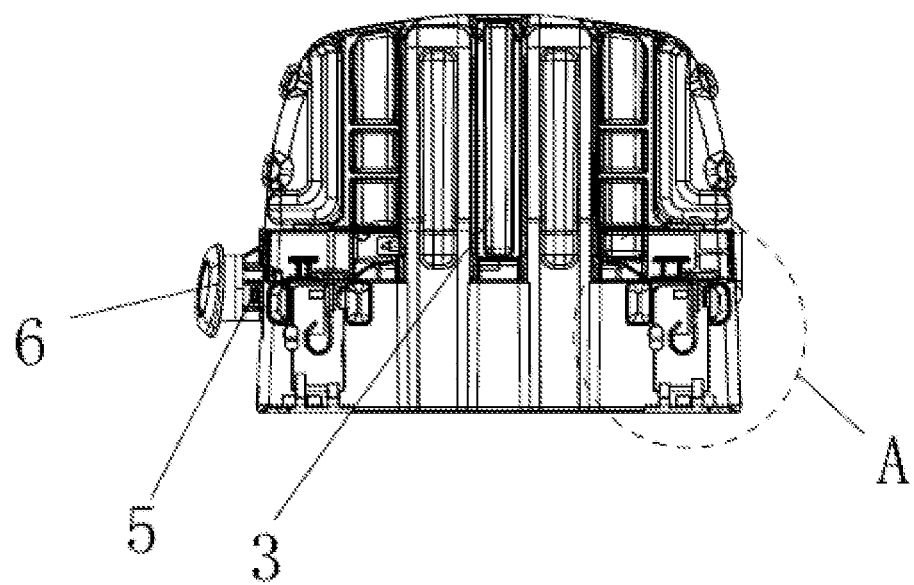
FIG. 2 is a front view of the integral frame according to the present invention.
Figure 3:
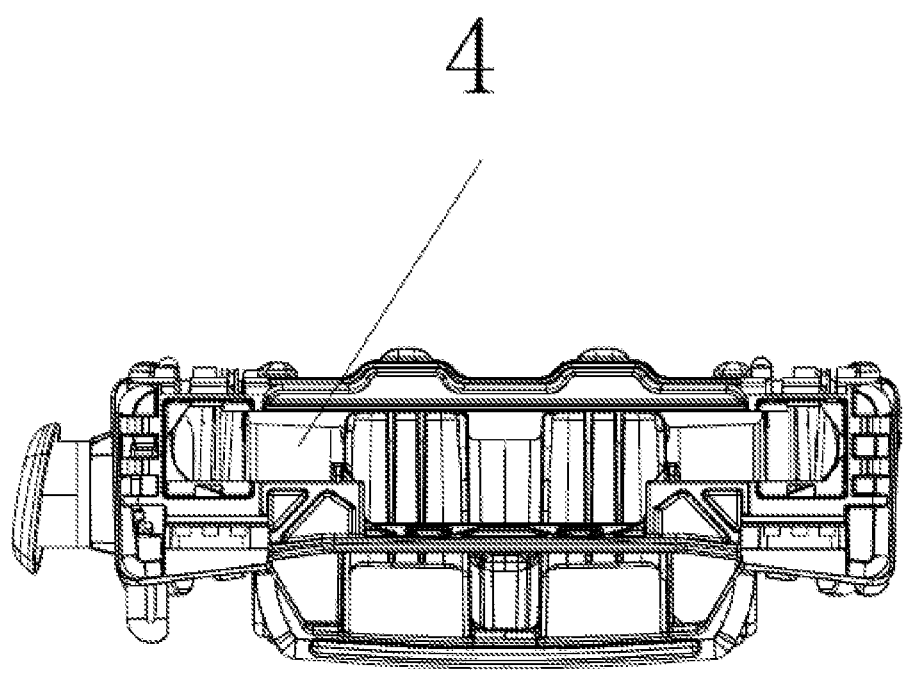
FIG. 3 is a bottom view of the integral frame according to the present invention.
Figure 4:
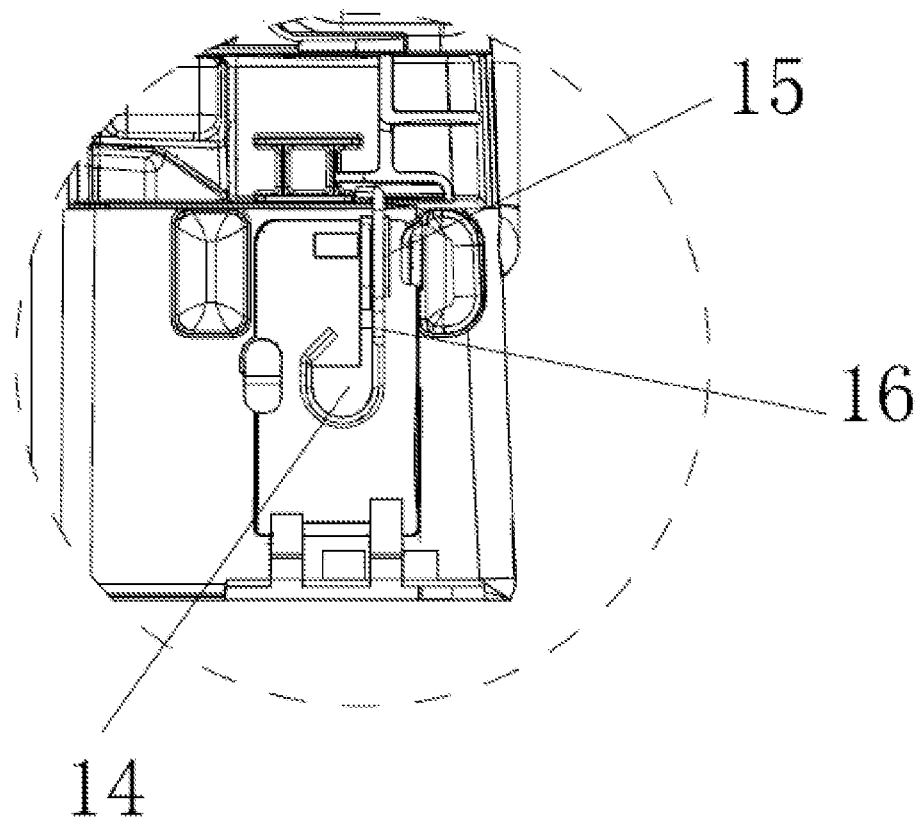
FIG. 4 is an enlarged view of portion A in FIG. 2 according to the present invention.
Figure 5:
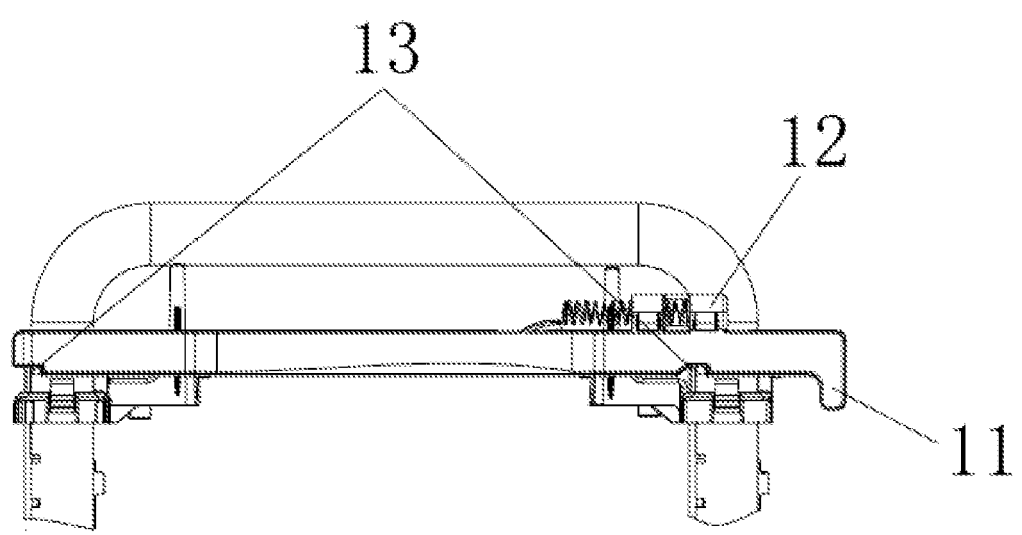
FIG. 5 is a structural view of the unlocking lever according to the present invention.
Figure 6:
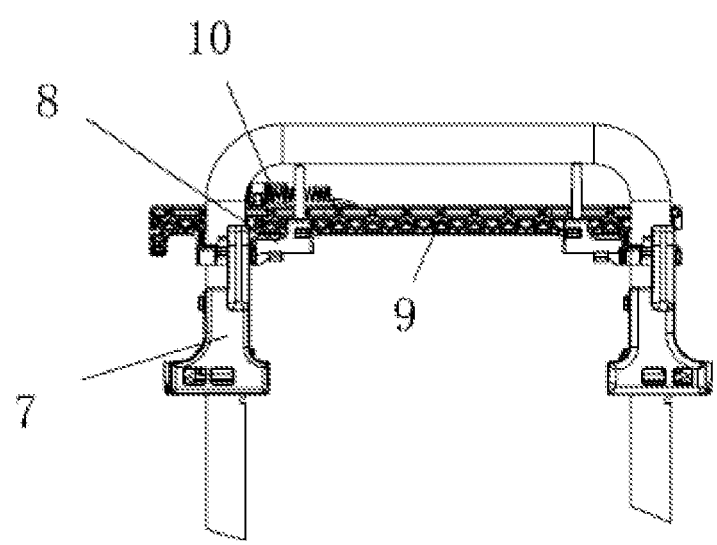
FIG. 6 is an assembled view of a rod limit bracket and a rod guide sleeve according to the present invention.
Figure 7:
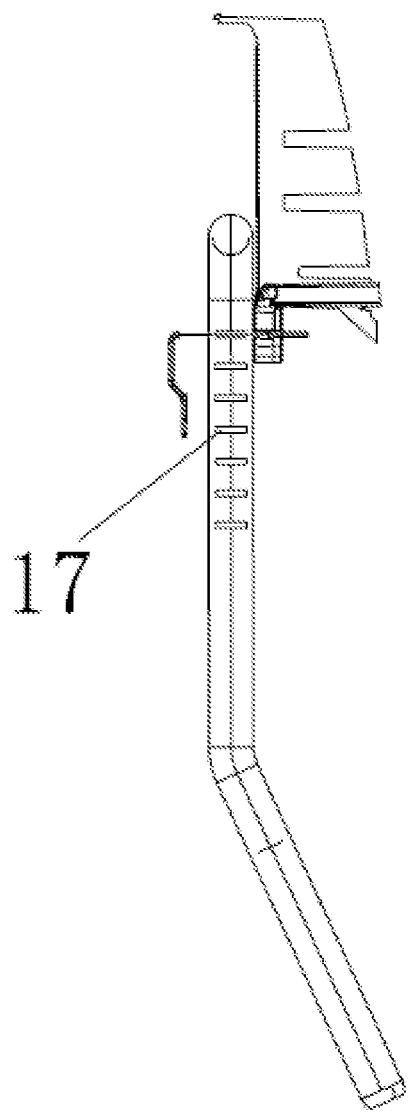
FIG. 7 is a structural view of a positioning groove according to the present invention.
Figure 8:
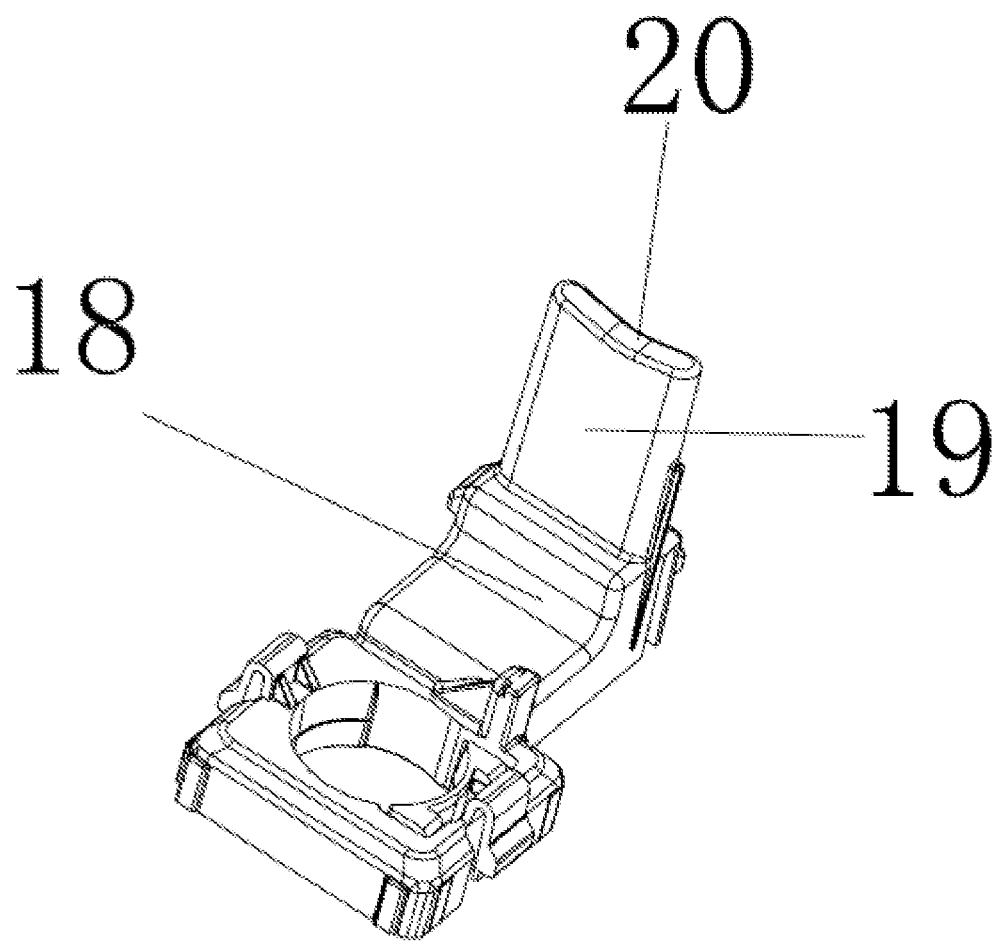
FIG. 8 is a structural view of the rod limit bracket according to the present invention.
Figure 9:
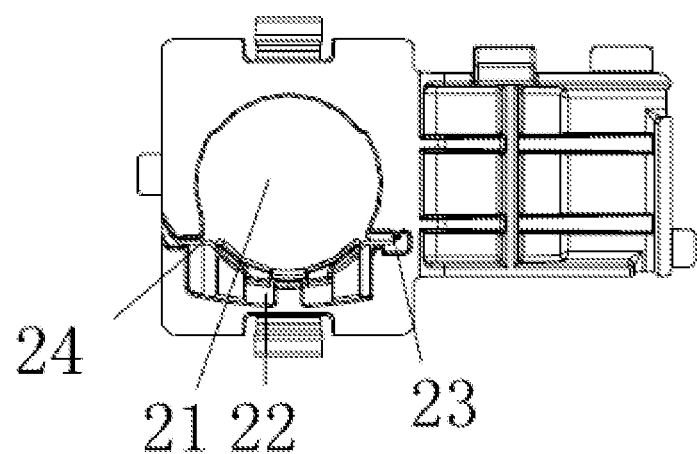
FIG. 9 is a bottom view of the rod limit bracket according to the present invention.
Figure 10:
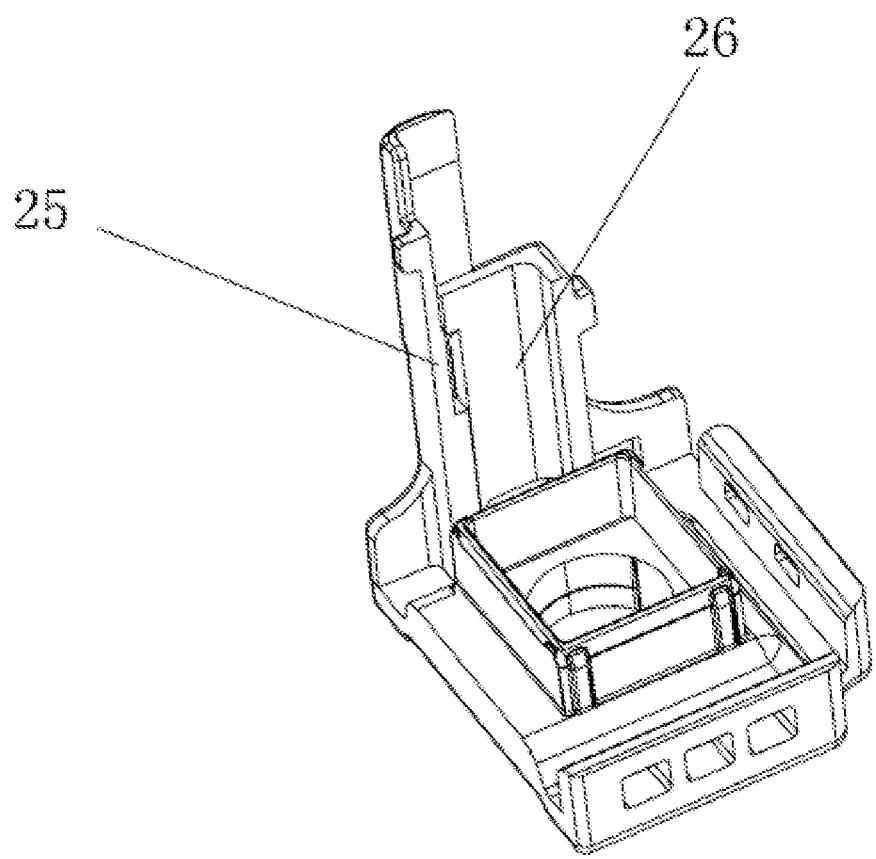
FIG. 10 is a structural view of the rod guide sleeve according to the present invention.
Figure 11:
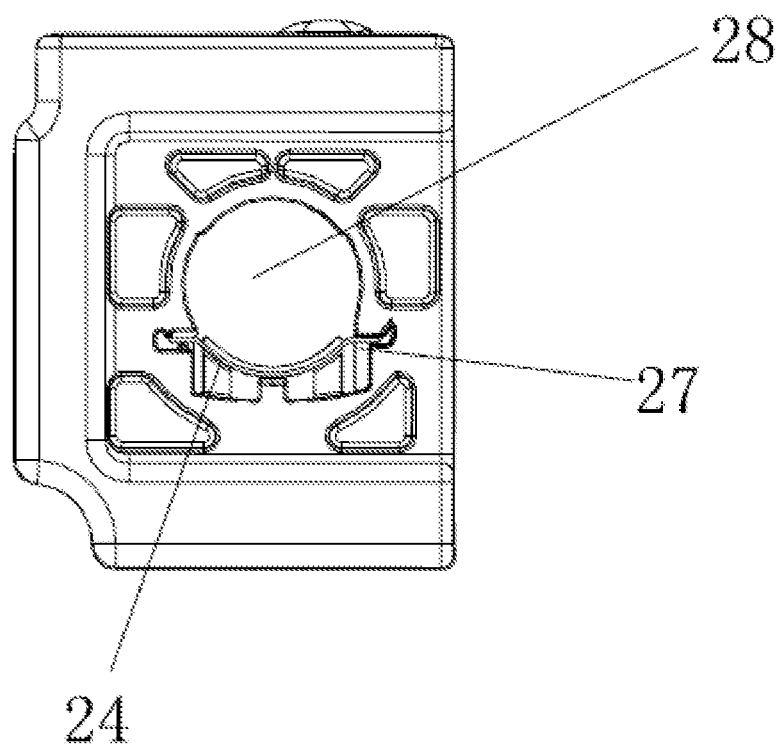
FIG. 11 is a bottom view of the rod guide sleeve according to the present invention.
Figure 12:
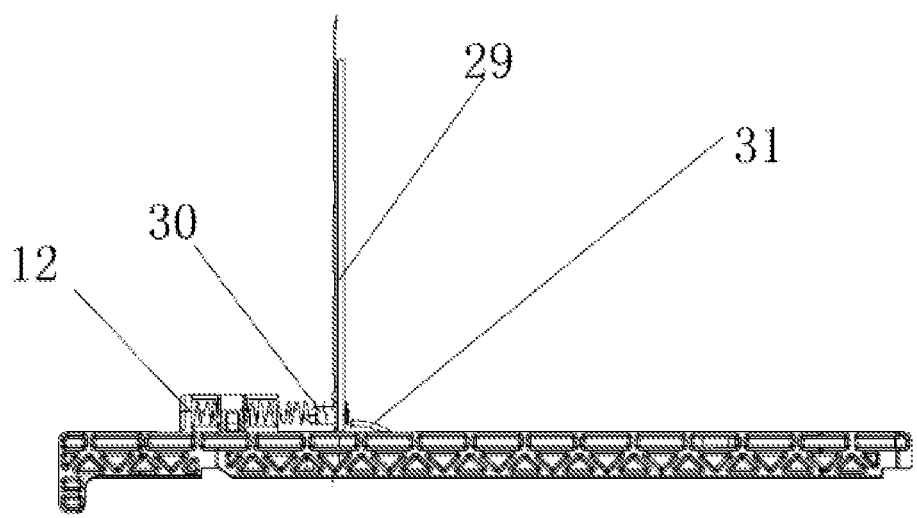
FIG. 12 is a partial view of a portion connecting an unlocking lever, a protruding positioning plate and a protruding column according to the present invention.

An embodiment of the present invention relates to an integral single-frame two-way headrest using a U-shaped single rod, as shown in FIGS. 1-12, including a U-shaped rod 2, an integral frame 3, and a cover 1. The integral frame 3 is externally covered with a cover 1, and the integral frame 3 is hollow inside. An opening 4 is arranged at a lower end of the integral frame 3, and an upper portion of the U-shaped rod 2 is inserted from the opening 4 into the interior of the integral frame 3. A row of positioning grooves 17 are disposed on the right side of two downwardly extending ends of the U-shaped rod 2. A rod guide sleeve 7 sleeved on both ends of the U-shaped rod 2 is mounted at both ends of the opening 4. The outer side of the integral frame 3 is mounted with an unlocking steel wire 16 corresponding to the positioning groove 17 at both ends of the U-shaped rod 2, and an unlocking lever 9 connected with the unlocking steel wire 16 and laterally movable is mounted in a hollow portion of the integral frame 3.

A rod limit bracket 8 is mounted above the rod guide sleeve 7. The rod limit bracket 8 is fastened in the integral frame 3, and a connecting hole 21 matching with the U-shaped rod 2 is arranged in the middle portion thereof. A positioning extension 18 is disposed on a side of the rod limit bracket 8 near the middle of the integral frame 3. A positioning post 19 is vertically disposed on the positioning extension 18, and the positioning post 19 is pressed against the middle of the U-shaped rod 2 when the U-shaped rod 2 is moved downward.

A deformable inner wall 22 is arranged at a lower portion of the rear side wall of the connecting hole 21, and a leakage groove is disposed inside the deformable inner wall 22. The deformable inner wall 22 is provided with a mounting groove 23 at both ends thereof, and a metal elastic sheet 24 that passes through the leakage groove is installed between two mounting grooves 23.

The lower outer ring of the rod guide sleeve 7 is provided with a fastening protrusion that matches with both sides of the opening 4 of the integral frame 3, and a positioning guide through hole 28 is arranged in a middle portion of the rod guide sleeve 7. An arc-shaped groove 27 is formed under an inner wall of the rear side of the positioning through hole 28, and the metal elastic sheet 24 is mounted in the arc-shaped groove 27. The front portion of the rod guide sleeve 7 is provided with a protective extension 25 extending upwardly and covering the mounting position of the unlocking steel wire 16, and an inner groove 26 is provided on the rear side of the protective extension 25 to match with the unlocking steel wire 16.

A central portion of the hollow portion of the integral frame 3 is disposed with a protruding positioning plate 29 at a lower end near the upper side of the unlocking lever 9. A spring mounting portion 12 is disposed on the upper side of the unlocking lever 9 at a position on the left side of the protruding positioning plate 29, and a positioning protrusion 31 is disposed at a position on the upper side of the unlocking lever 9 at the right side of the protruding positioning plate 29. The lower portion of the left side of the protruding positioning plate 29 is arranged with a protruding column 30, and a return spring 10 is installed between the protruding column 30 and the spring mounting portion 12.

The positioning protrusion 31 is higher than the lower end of the protruding positioning plate 29, and a side of the positioning protrusion 31 near the protruding positioning plate 29 has a vertical wall structure.

Unlocking grooves 13 corresponding to each of two unlocking steel wires 16 respectively are arranged on the lower side of the unlocking lever 9.

A button seat 5 is mounted on a lower left side of the integral frame 3 at a position near the left end of the unlocking lever 9, and an unlocking button 6 abutting against the left end of the unlocking lever 9 is mounted in the button seat 5.

The left end of the unlocking lever 9 is bent downward to form a contact end 11.

A steel wire fixing protrusion 14 is disposed at a position of the front side of the integral frame 3 where the unlocking steel wire 16 is mounted, and the steel wire fixing protrusion 14 has a semicircular convex structure. The right side of the steel wire fixing protrusion 14 extends upward to form a steel wire positioning extension matching with the vertical portion of the unlocking steel wire 16. A steel wire positioning groove 15 is disposed at an upper end of the steel wire positioning extension. The lower end of the unlocking steel wire 16 is wound around the outer ring of the steel wire fixing protrusion 14, and the upper end of the unlocking steel wire 16 is engaged with the steel wire positioning groove 15.

EXAMPLES

When assembling, the unlocking lever 9 is first installed laterally in the hollow interior of the integral frame 3, while a return spring 10 is mounted inside the spring mounting portion 12 of the unlocking lever 9, and the projecting end of the return spring 10 is sleeved on the positioning projection 31 on the protruding positioning plate 29 inside the integral frame 3, the button seat 5 and the unlocking button 6 are then mounted on the integral frame 3. One end of the unlocking button 6 is in contact with the contact end 11 of the unlocking lever 9. After this, the U-shaped rod 2 with the rod limit brackets 8 is fitted from the lower opening 4 of the integral frame 3 into the integral frame, then a support rod limit bracket 8 is sleeved on both ends of a U-shaped rod 2, and the positioning posts 19 of the two rod limit brackets 8 are located below the middle of the U-shaped rod 2, and an arc-shaped positioning groove 20 is arranged in the frame 3 at the upper end of the positioning post 19. Then, two unlocking steel wires 16 are mounted on the steel wire fixing protrusions 14, the upper end of the unlocking steel wire 16 passes through the positioning groove 17 on the U-shaped rod 2 and the unlocking groove 13 on the unlocking lever 9 in order. Finally, the two rod guide sleeves 7 are loaded from both ends of the U-shaped rod 2, and the rod guide sleeves 7 are fastened in both ends of the lower opening 4 of the integral frame 3. The integral frame 3 is designed in an integrated structure, and the interior of the frame is hollow, which can effectively save the amount of raw materials for products without reducing the structural strength, thereby reducing cost. When the conventional two-way headrest is installed, it is usually necessary to select a double-rod structure. When assembling, the double rod structure is usually assembled by tooling, which greatly increases production cost and cannot guarantee production efficiency.

Since the lower part of the U-shaped rod 2 is bent at a certain angle, in order to facilitate the installation of the rod guide sleeve 7 and the rod limit bracket 8, a special structure is designed for the rod guide sleeve 7 and the rod limit bracket 8. The lower end of the guide sleeve 7 is designed with an arc-shaped groove 27, so that the positioning through hole 28 of the rod guide sleeve 7 has a certain deformation, which facilitates the assembly of the U-shaped rod 2 and the rod guide sleeve 7. Meanwhile, in order to prevent the positioning through hole 28 from being damaged due to excessive deformation, a metal elastic sheet 24 is mounted in the arc-shaped groove 27, and a metal elastic sheet 24 is also mounted in the rod limit bracket 8. Different from that of the rod guide sleeve 7, the metal elastic sheet 24 is completely inserted into the rod limit bracket 8 through the injection molding machine. With this structure, it is mainly considered that the rod limit bracket 8 is located above the rod guide sleeve 7, which is connected with the integral frame 3 by means of a buckle type structure. In order to make the structure more stable, the structural rigidity of the external snap portion needs to be strengthened, so the connecting hole 21 requires a larger deformation. While ensuring that the external structure of the rod limit bracket 8 is not affected, it can only be used by way of a larger leakage groove arranged in the interior of the rod limit bracket 8. Since a larger leakage groove may create a hidden danger that the metal elastic sheet 24 cannot be fixed, the metal elastic sheet 24 is embedded into the rod limit bracket 8.

What is claimed is:

1. An integral single-frame two-way headrest with a U-shaped single rod, comprising a U-shaped rod, an integral frame and a cover, wherein the integral frame is externally covered with the cover, the integral frame is hollow inside, an opening is arranged at a lower end of the integral frame, and an upper portion of the U-shaped rod is inserted into the inner frame from the opening, a plurality of positioning grooves is arranged on right side of one of two downwardly extending ends of the U-shaped rod, a rod guide sleeve sleeved on both ends of the U-shaped rod is mounted at both ends of the opening, an outer side of the integral frame is mounted with an unlocking steel wire corresponding to the positioning grooves, an unlocking lever connected with the unlocking steel wire and being laterally movable is mounted in a hollow portion of the integral frame, a button seat is mounted on a lower left side of the integral frame at a position near a left end of the unlocking lever, an unlocking button abutting against the left end of the unlocking lever is mounted in the button seat, the left end of the unlocking lever is bent downward to form a contact end, a steel wire fixing protrusion is disposed at a position of a front side of the integral frame where the unlocking steel wire is mounted, the steel wire fixing protrusion has a semicircular convex structure, a right side of the steel wire fixing protrusion extends upward to form a steel wire positioning extension matching with a vertical portion of the unlocking steel wire, a steel wire positioning groove is disposed at an upper end of the steel wire positioning extension, a lower end of the unlocking steel wire is wound around an outer ring of the steel wire fixing protrusion, and an upper end of the unlocking steel wire is engaged with the steel wire positioning groove.

2. The integral single-frame two-way headrest with a U-shaped single rod according to claim 1, wherein a rod limit bracket is arranged above the rod guide sleeve, the rod limit bracket is fastened in the integral frame, the rod limit bracket has a connecting hole matching with the U-shaped rod, a middle portion of the U-shaped rod is configured to be arranged in the connecting hole, a positioning extension is disposed on a side of the rod limit bracket in a middle portion of the integral frame, a positioning post is vertically disposed on the positioning extension, and the positioning post is pressed against a middle portion of the U-shaped rod when the U-shaped rod is moved downward.

3. The integral single-frame two-way headrest with a U-shaped single rod according to claim 2, wherein a deformable inner wall is arranged at a lower portion of a rear side wall of the connecting hole, a leakage groove is disposed inside the deformable inner wall, the deformable inner wall is provided with mounting grooves at both ends of the deformable inner wall, and a metal elastic sheet that passes through the leakage groove is installed between the mounting grooves.

4. The integral single-frame two-way headrest with a U-shaped single rod according to claim 1, wherein a lower outer ring of the rod guide sleeve is provided with a fastening protrusion that matches with both sides of the opening of the integral frame, a positioning through hole is arranged in a middle portion of the rod guide sleeve, an arc-shaped groove is formed under an inner wall of a rear side of the positioning through hole, a metal elastic sheet is mounted in the arc-shaped groove, a front portion of the rod guide sleeve is provided with a protective extension extending upwardly and covering a mounting position of the unlocking steel wire, and an inner groove matching with the unlocking steel wire is provided on a rear side of the protective extension.

5. The integral single-frame two-way headrest with a U-shaped single rod according to claim 1, wherein a central portion of the hollow portion of the integral frame is arranged with a protruding positioning plate at a lower end near an upper side of the unlocking lever, a spring mounting portion is disposed on the upper side of the unlocking lever at a position on a left side of the protruding positioning plate, a positioning protrusion is disposed at a position on the upper side of the unlocking lever at a right side of the protruding positioning plate, a lower portion of the left side of the protruding positioning plate is arranged with a protruding column, and a return spring is installed between the protruding column and the spring mounting portion.

6. The integral single-frame two-way headrest with a U-shaped single rod according to claim 5, wherein the positioning protrusion is higher than lower end of the protruding positioning plate, and a side of the positioning protrusion near the protruding positioning plate has a vertical wall structure.

7. The integral single-frame two-way headrest with a U-shaped single rod according to claim 1, wherein unlocking grooves corresponding to each of two unlocking steel wires respectively are arranged on a lower side of the unlocking lever.

\* \* \* \* \*